Sept. 18, 1934.  E. H. SCHWEERING  1,973,826

BRAKE AND CLUTCH OPERATING MECHANISM

Filed July 11, 1932

ERNEST H. SCHWEERING,
INVENTOR.

BY *James R. Cole*

ATTORNEYS.

Patented Sept. 18, 1934

1,973,826

UNITED STATES PATENT OFFICE 1,973,826

BRAKE AND CLUTCH OPERATING MECHANISM

Ernest H. Schweering, Tulsa, Okla.

Application July 11, 1932, Serial No. 621,814

3 Claims. (Cl. 192—13)

My invention relates to new and useful improvements in brake and clutch operating mechanism adapted to use with an internal combustion engine, and, altho applicable to use generally with gas engines and transmission therewith connected, has for its primary object to provide a simple, inexpensive and readily attachable means of automatically operating the clutch of an automobile thru a brake lever.

With the above and other objects in view which will appear as the description proceeds, my invention consists in the novel features hereinafter set forth in detail, illustrated in the accompanying drawing and more particularly pointed out in the appended claims.

Referring to the drawing in which numerals of like character designate similar parts thruout the several views.

Figures 1, 2:
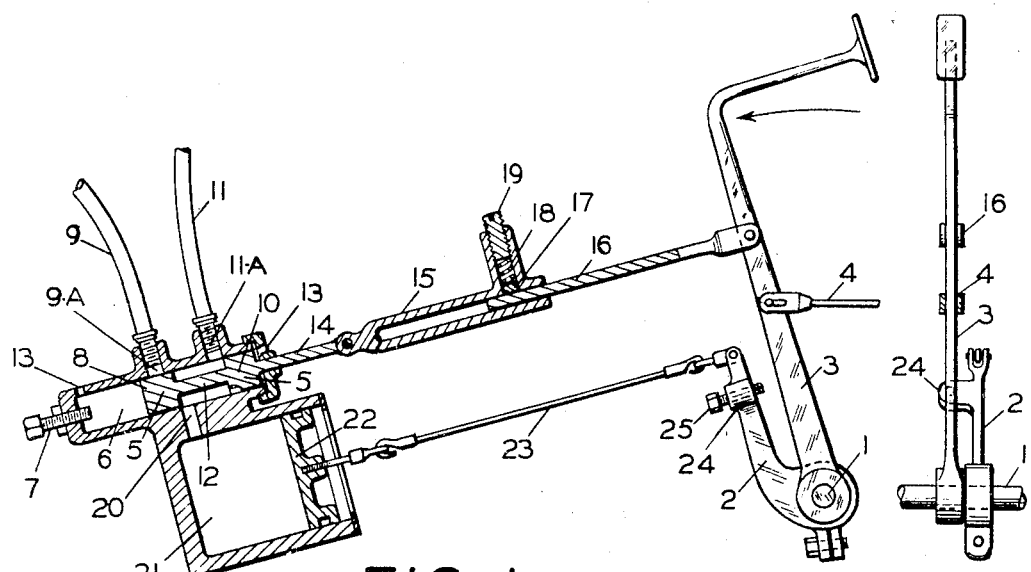
Fig. 1 is a view in side elevation of a brake lever and a clutch lever as conventionally arranged on an automobile with my invention connected therewith and shown partly in cross section in normal inactive position.
Fig. 2 is a view in front elevation of said brake lever and said clutch lever.
Figure 3:
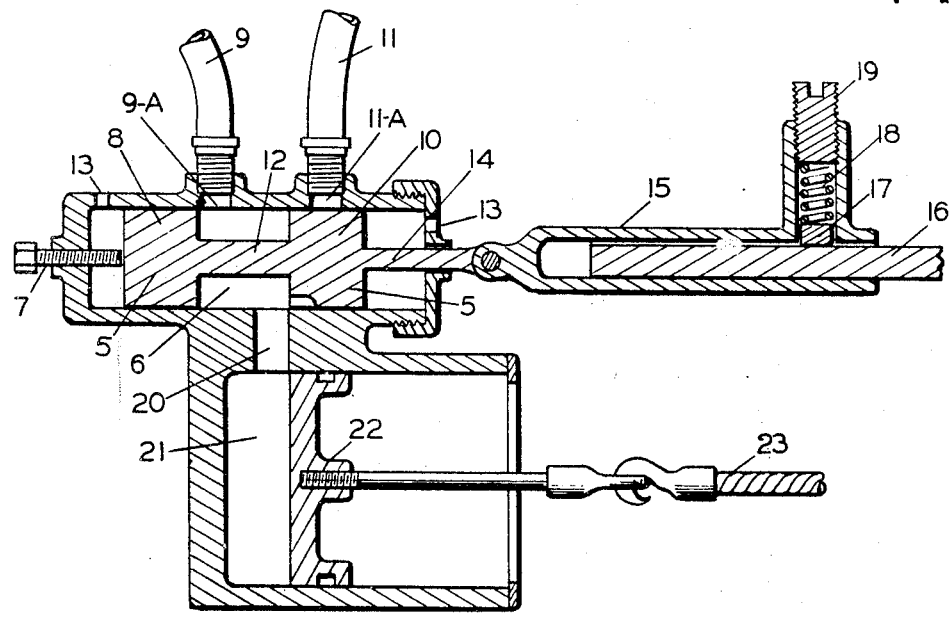
Fig. 3 is a detailed view in cross section of the operative part of my invention showing the same in position when the clutch is released.

1 represents the clutch lever journal with 2 the clutch lever and 3 the foot brake lever mounted thereon, and 4 the brake rod connected with said brake lever and thru which the brake mechanism is operated by said lever.

5 represents generally a dual slide valve in a valve chamber 6 with 7 an adjustable stop for said valve to limit its travel in one direction. The slide valve 5 in reality is two valves, one valve 8 controlling a duct 9 connected with the intake manifold, not shown, of the gas engine, and the other valve 10 controlling a duct 11 which is preferably connected into the crank case, not shown, of said engine, altho it may open to atmosphere instead. The two valves 8 and 10 are shown as being connected by a stem or rod 12, making the dual valve assembly that of a spool type construction. The stem 12 is also a spacer to hold the two valves in spaced relationship one to the other permitting them to coact to open and to close their respective ports 9a and 11a in ducts 9 and 11. 13 is merely a vent for the valve chamber to prevent compression at either end thereof by valve 5 therein.

14 represents the valve stem for said dual valve 5 with said valve stem slidably connected to said brake lever 3 by linkage comprising two telescoping members, 15 being a tubular member, and 16 being a rod member, connected together with a frictional sliding contact wherein a brake shoe 17 is mounted on member 15 and adapted to be compressed against member 16 by a spring 18 the power of which is regulated by the screw 19. The slidable contact thus provided in the linkage is adjusted to provide sufficient friction between members 15 and 16 as will cause valve 5 to be actuated thru them, yet permitting rod 16 to continue its travel after said valve has reached its limit of travel.

Connected with said valve chamber 6 and positioned to open therein between the two valves 8 and 10, is a port 20 communicating with a piston chamber 21 wherein is located a piston 22 connected by a flexible cable 23 to the clutch lever 2. The port 20 and the ports 9a and 11a and the valves 8 and 10 are all relatedly spaced to alternately permit ducts 9 and 11 to communicate with the piston chamber 21.

On the lever 2 is a projection 24 holding an adjustable screw 25 adapted to travel in the plane of the movement of lever 3 and whereby the last named lever may engage said first named lever independent of the operation of the mechanism heretofore described when said mechanism has not withdrawn said lever 2 out of possible contact with said lever 3.

In operation, as applied to an automobile, as shown in Fig. 1 with the brake disengaged and the clutch engaged, the brake pedal or lever 3 is moved forward in the direction indicated by the arrow sufficiently to cause valve 8 to open port 9a and to cause valve 10 to close port 11a, whereupon, if the engine is running, a partial vacuum is created in piston chamber 21 sufficient to cause piston 22 to be moved forward to cause it in turn to likewise move clutch lever 2 forward sufficiently to fully disengage the clutch. The necessary movement of the lever 3 for this purpose is slight. Then, if the operator desires to apply the brakes actuated by said lever 3, the lever 3 is pressed still further forward during which operation the slide valve 5 is moved to its limit stop 7 with the port 9a continuing open and the port 11a continuing closed. When the limit of the movement of said valve is reached as aforesaid, the continued pressure on lever 3 causes the rod 16 to slide in member 15 until lever 3 has been operated to its limit, as sufficient clearance is provided between the end of the rod in the tube and the bottom of the tube.

When the brakes are released by the release of the pressure on lever 3, the frictional grip of the shoe 17 on the rod 16 is sufficient to cause the slide valve 5 to return to its normal position, during which return port 9a is closed by valve 8 and port 11a is opened by valve 10, whereupon duct 11 is placed in communication with the piston chamber 21 and under atmosphere the partial vacuum previously existing in said chamber is filled at atmosphere, permitting piston 22 to be returned to its original position in said chamber thru tension provided in the conventional clutch. When the slide valve 5 reaches the limit of its return travel, the rod 16 continues its movement sliding on the brake shoe 17.

Preferably duct 11 is connected into the crank case of the engine, in which event the oil vapors therefrom will lubricate the valves and piston of my mechanism.

If the engine is not running when the brake lever is operated as aforesaid, the piston 22 of course is not moved as no vacuum can be created in the piston chamber 21, and in that event when lever 3 has moved sufficiently to cause it to contact screw 25 the further movement of lever 3 carries with it lever 2 thus causing the clutch to become disengaged.

In operation with duct 11 connected into the crank case of the engine and duct 9 connected into the intake manifold thereof, when the suction created by the engine draws the air and oil vapors from chamber 21 into the intake manifold, the mixture in said manifold is not so greatly changed as it would be if duct 11 was not connected into the crank case but was merely open to atmosphere, for in the last mentioned case the air entering the manifold from said chamber 21 would not bear oil and gas vapors and would therefore dilute the mixture in the manifold, and when the mixture therein was very lean in gas content the dilution would materially affect the momentary operation of the engine, particularly when the engine was running slowly, in which last mentioned condition the engine might cease running entirely.

Another operation of my mechanism as applied to a motor vehicle is as follows; to wit, when the vehicle is being operated slowly with the brakes frequently applied, as in traffic or in parking or moving the car from parking where the parking space is very limited, it is desirable to be able to slightly apply the brakes and momentarily release the clutch and reengage the clutch, without causing a full and complete release of the clutch as by operating with my automatic clutch releasing mechanism. In this case the lever 3 is pressed forward in the usual manner causing the clutch to be automatically released. Then the lever is permitted to return sufficiently to cause the clutch to be reengaged, but not sufficiently to remove lever 3 from contact with screw 25 on clutch lever 2. When the levers are in the position described, the cable 23 is slack, and lever 2 thru screw 25 therein is resting on lever 3, and the valve 5 is in position where it may slide somewhat without opening port 9a to cause piston 22 to be actuated. In this position lever 3 may be gently moved, within limitations, to lightly apply the brakes and at the same time disengage or partially disengage the clutch by reason of the contact of the two levers 2 and 3 as aforesaid, and with the reverse movement of lever 3 to release the brakes and reengage the clutch, all of which may be done without causing the piston 22 to be actuated to cause the clutch to be released by vacuum created in the chamber 21.

Having thus fully described my invention, what I claim and desire to secure by Letters Patent is:

1. A brake and clutch operating mechanism including a brake lever, a valve stem adapted to be slidably connected to said brake lever, a valve on said valve stem adapted to open and to close the hereinafter mentioned duct, a valve on said valve stem coacting with said first named valve and adapted to open and to close the hereinafter mentioned outlet from the hereinafter mentioned piston chamber, a duct as aforesaid communicating with said piston chamber and adapted to be connected with the intake manifold of a gas engine, an outlet as aforesaid from said piston chamber, a piston chamber as aforesaid, a piston therein, a flexible connecting rod adapted to be attached to said piston and also to be connected to a lever of a clutch operating mechanism, and means adapted to contact said brake lever for manually disengaging said clutch.

2. The combination of a gas engine, a power transmission thereto connected, a clutch in said power transmission, a brake operatively connected with said power transmission, a brake lever adapted to actuate said brake, a valve stem slidably connected to said brake lever, a valve on said valve stem adapted to open and to close the hereinafter mentioned duct, a valve actuated by said valve stem coacting with said first named valve and adapted to open and to close the hereinafter mentioned outlet from the hereinafter mentioned piston chamber, a duct as aforesaid communicating with said piston chamber and connected into the intake manifold of said gas engine, an outlet as aforesaid from said piston chamber, a piston chamber as aforesaid, a piston therein, a clutch lever adapted to actuate said clutch, linkage connecting said clutch lever with said piston, and means on said clutch lever adapted to engage said brake lever independent of the operation of said linkage connecting said clutch lever with said piston.

3. The combination of a motor vehicle having brakes and a clutch, a lever operatively connected with said brakes, means connected with said lever for automatically disengaging said clutch and with said means further adapted to reengage said clutch after its disengagement as aforesaid, and additional means adapted to contact said lever, for operating said clutch with said lever independent of the operation of said first mentioned means.

ERNEST H. SCHWEERING.